United States Patent
Slater et al.

(10) Patent No.: US 11,228,260 B2
(45) Date of Patent: Jan. 18, 2022

(54) METHOD AND APPARATUS FOR CONTROL OF SWITCHED RELUCTANCE MOTORS

(71) Applicant: Sevcon Limited, Gateshead (GB)

(72) Inventors: Howard Slater, Gateshead (GB); David Hodgson, Gateshead (GB)

(73) Assignee: Turntide Technologies, Inc., Sunnyvale, CA (US)

( * ) Notice: Subject to any disclaimer, the term of this patent is extended or adjusted under 35 U.S.C. 154(b) by 9 days.

(21) Appl. No.: 16/467,279

(22) PCT Filed: Dec. 11, 2017

(86) PCT No.: PCT/GB2017/053709
§ 371 (c)(1),
(2) Date: Jun. 6, 2019

(87) PCT Pub. No.: WO2018/104754
PCT Pub. Date: Jun. 14, 2018

(65) Prior Publication Data
US 2019/0305697 A1   Oct. 3, 2019

(30) Foreign Application Priority Data
Dec. 9, 2016  (GB) .................................. 1621020

(51) Int. Cl.
*H02P 25/08* (2016.01)
*H02P 1/16* (2006.01)
(Continued)

(52) U.S. Cl.
CPC ............. *H02P 1/163* (2013.01); *H02P 25/08* (2013.01); *H02P 6/183* (2013.01); *H02P 6/185* (2013.01); *H02P 6/186* (2013.01); *H02P 25/089* (2016.02)

(58) Field of Classification Search
CPC .. H02P 2203/00; H02P 2203/01; H02P 1/163; H02P 25/08; H02P 6/185; H02P 6/186
See application file for complete search history.

(56) References Cited

U.S. PATENT DOCUMENTS 6,288,514 B1 * 9/2001 Direnzo .................... H02P 6/17
                                                    318/701
6,396,236 B1 * 5/2002 Luukko ................... H02P 21/28
                                                    318/700
(Continued)

FOREIGN PATENT DOCUMENTS

EP    1 139 560 A1   10/2001
EP    1553691 A1     7/2005

*Primary Examiner* — Bickey Dhakal
(74) *Attorney, Agent, or Firm* — Temmerman Law; Mathew J. Temmerman

(57) ABSTRACT

A method of controlling a switched reluctance motor is disclosed herein. The motor comprises a stator carrying a plurality of phase windings and a rotor. The method comprises activating the phase windings in a sequence selected to apply torque to the rotor, wherein during a cycle of rotation of the rotor the phase windings switch between an active state in which current in the phase winding applies torque to the rotor and an inactive state; applying a voltage to a selected phase winding whilst the selected phase winding is in the inactive state to provide a flux in the selected phase winding; determining the current in the selected phase winding; determining the rotor angle based on the current and the flux; and controlling said activating based on the rotor angle.

4 Claims, 6 Drawing Sheets

(51) Int. Cl.
*H02P 6/185* (2016.01)
*H02P 25/089* (2016.01)
*H02P 6/18* (2016.01)

(56) References Cited

U.S. PATENT DOCUMENTS

| | | | |
|---|---|---|---|
| 6,853,163 B2* | 2/2005 | Slater | H02P 25/089 |
| | | | 318/700 |
| 7,288,915 B2* | 10/2007 | Norman | H02P 6/185 |
| | | | 318/432 |
| 9,899,946 B2* | 2/2018 | Han | H02P 21/18 |
| 2002/0149331 A1* | 10/2002 | Marcinkiewicz | B23K 20/121 |
| | | | 318/254.1 |
| 2004/0245983 A1 | 12/2004 | Mayes | |
| 2005/0067998 A1 | 3/2005 | Green | |
| 2005/0151501 A1* | 7/2005 | Norman | H02P 25/089 |
| | | | 318/701 |
| 2008/0157706 A1* | 7/2008 | Loudot | H02P 25/092 |
| | | | 318/701 |
| 2009/0134831 A1* | 5/2009 | Tankard | H02P 6/16 |
| | | | 318/490 |

* cited by examiner

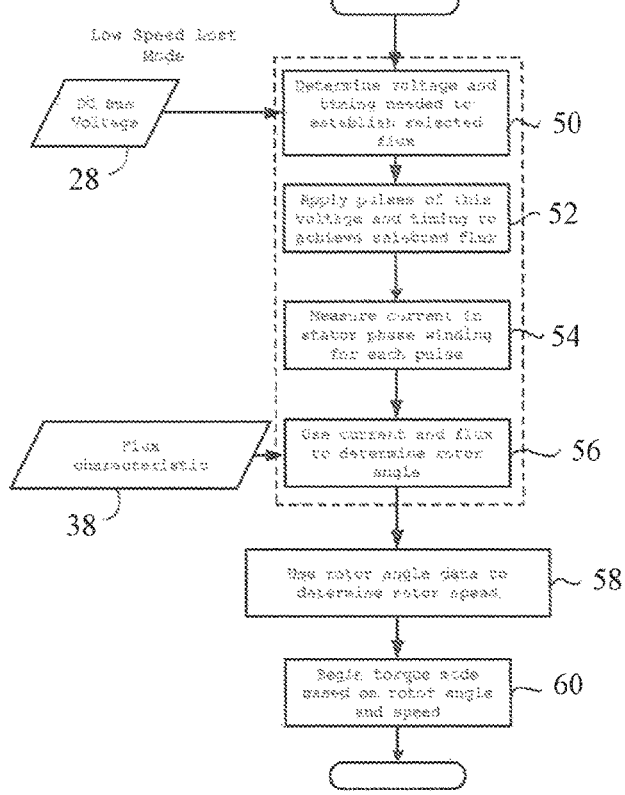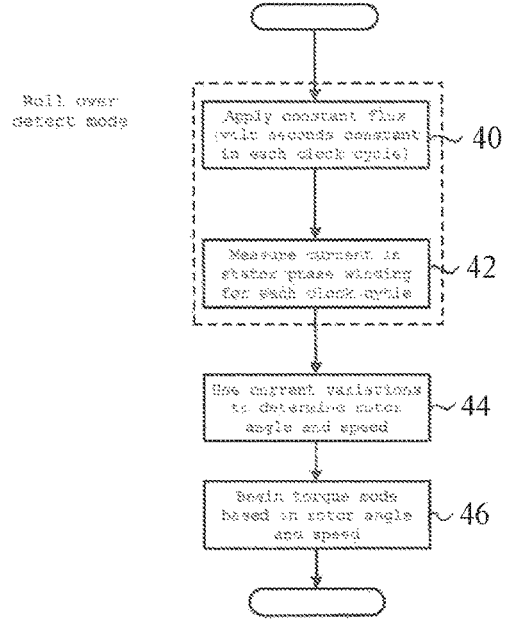

Low Speed Torque Mode

Predictor corrector for estimating rotor angle in High Speed Torque Mode

METHOD AND APPARATUS FOR CONTROL OF SWITCHED RELUCTANCE MOTORS

FIELD OF INVENTION

The present disclosure relates to the control of switched reluctance motors, and still more particularly to the sensorless control of switched reluctance motors.

BACKGROUND

In switched reluctance (SR) motors current pulses are applied to the stator phase coils with a timing that is selected based on the position of the rotor relative to the stator poles. The timing of the stator phase coil excitations determines the performance of the motor.

It has been proposed to control the delivery of energy to the stator coils based on sensing the angular position of the rotor using sensors such as rotary encoders. The use of rotary encoders can be problematic.

Different types of logic may be used to control the timing with which the stator coils are energised.

A digital signal processor (DSP) generally comprises a set of memory registers and a processor that is driven by a clock. The operations of a DSP may be driven by reading values from the input memory registers once per clock cycle. This so called polling driven input/output (as opposed to interrupt driven input/output) places a limit on the timing resolution of DSPs. For example, if the value of a particular signal level (such as the angle of the rotor) is monitored by polling a memory register once per cycle to determine its level, then the clock cycle timing imposes temporal jitter on the observations of that signal level. There is no way to know when during a clock cycle the signal level changed. It may have changed at the beginning or end of the clock cycle, or at any time between. The only way to improve timing resolution is to reduce the clock period—which comes with a heavy penalty in processing overhead. As a result, in timing sensitive applications, such as the control of SR motors, DSPs suffer some drawbacks.

Another option is to use a microcontroller, such as an application specific integrated circuit (ASIC) or a field programmable gate array (FPGA). Although more expensive, such microcontrollers may be interrupt driven—for example they may comprise digital logic inputs which can interrupt the processor to trigger events based on input signal levels. This may avoid the jitter associated with polling input/output systems such as DSPs.

For high speed applications, in which accurate timing is of high importance, interrupt driven systems are often a favoured choice

SUMMARY OF INVENTION

Aspects and embodiments of the disclosure are set out in the claims and relate to the control of electric motors, such as switched reluctance or SR motors. Some embodiments aim to address at least a part of the above described technical problems, or associated problems.

BRIEF DESCRIPTION OF DRAWINGS

Embodiments of the disclosure will now be described, by way of example only, with reference to the accompanying drawings, in which:

FIG. 3 is a flow chart illustrating one method of operating a control apparatus such as that illustrated in FIG. 1;

FIG. 4 is a flow chart illustrating one method of operating a control apparatus such as that illustrated in FIG. 1;

In the drawings like reference numerals are used to indicate like elements.

SPECIFIC DESCRIPTION

Figure 1:
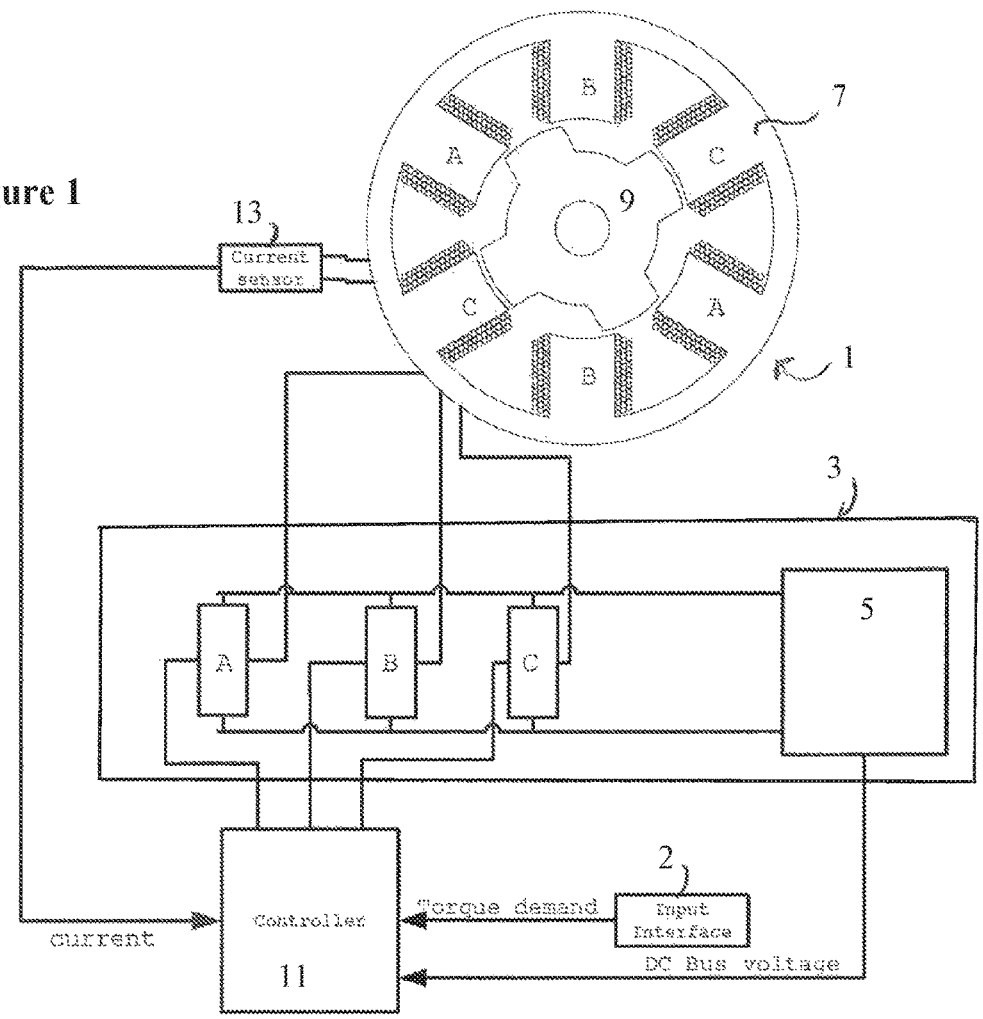
FIG. 1 shows a switched reluctance motor and a control apparatus for the motor.

FIG. 1 shows an apparatus comprising an SR motor 1, a power provider 3 for driving the SR motor 1, and a control system for controlling the power provider to drive the SR motor.

The SR motor 1 comprises a stator 7 and a rotor 9, both of which may have salient poles. The stator 7 comprises a magnetic yoke which surrounds the rotor. The stator poles are arranged in opposing pairs around the yoke. Windings are arranged on the stator poles, and the windings on each opposing pair of poles are electrically coupled to allow them to be driven together—e.g. to provide one motor phase. The rotor 9 and stator poles are arranged so that the air gap between the rotor and stator varies with the angular position of the rotor 9. Accordingly, the inductance of the stator windings also varies according to the position of the rotor. When a rotor pole is aligned with a stator pole, the inductance of a winding carried by that pole may increase. When no rotor pole is aligned with that stator pole, its inductance decreases. The distribution of coils on different stator poles enables the motor to be excited by energising the coils in sequence. For example, the three phase SR motor illustrated in FIG. 1 has six stator poles, arranged in three opposing pairs. The windings carried on each opposing pair of stator poles may be energised together to provide one phase of the motor. The rotor 9 can then be driven to rotate by driving currents through the three phases in sequence. In order to drive the motor effectively, the timing of the excitation of each of the three phases is selected based upon the position of the rotor.

The power provider 3 comprises an energy source 5, and three phase drives, A, B, C. The three phase drives are all coupled to receive energy from the energy source 5. Each of the phase drives is also coupled to a corresponding one of the three phase windings of the SR motor 1. Each phase drive is coupled to a different phase winding. The phase drives are each controllable to modulate the delivery of electrical energy from the energy source to the corresponding phase winding. The phase drives may each comprise a full bridge, such as a 4-switch bridge or H-bridge.

The control system comprises an input interface 2, a controller 11, and a current sensor 13. The controller 11 comprises operator logic 14, and a plurality of memory registers for storing data for input and/or output from the controller. The controller 11 is arranged to be driven by a clock signal. The controller may be configured to provide polling input/output based on this clock signal (as opposed to interrupt driven input/output)—e.g. to operate in the manner of a DSP, so that data can be read from and written to each of the memory registers once per clock cycle. Operating in this way, the controller can obtain parameters of the motor, and provide control signals to the motor 1 at a series of discrete time points (or steps) each separated by a time increment (one or more clock cycles). Each period of rotation of the rotor 9 generally comprises a plurality of such time increments.

The current sensor 13 is coupled to at least one of the three phase windings, and to the controller 11. The current sensor 13 is configured to sense current in the winding(s) to which it is coupled, and to provide a current sense signal, indicating the current in that(those) winding(s), to the controller 11. This can enable current data to be provided to input memory registers 20, 22, 24, 26 of the controller 11.

The controller 11 is also coupled to each of the three phase drives A, B, C. It may comprise input/output memory registers for storing rotor angle 16 and rotor speed 18 data values and data values indicating a torque demand signal from the input interface 2 and the DC Bus voltage 28 of the energy source 5.

Figure 2:
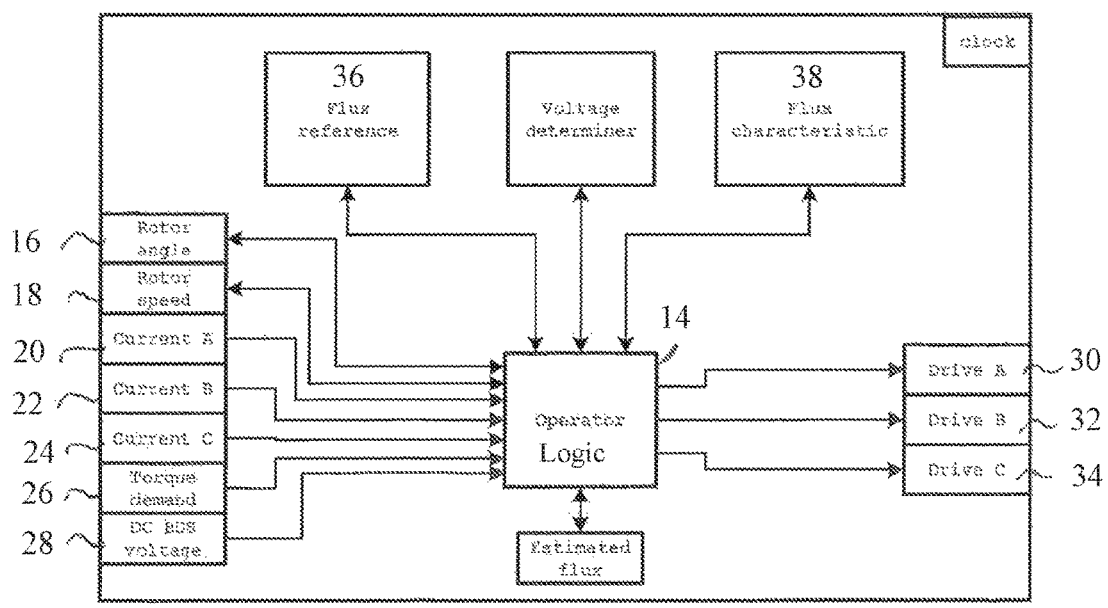
FIG. 2 shows one example of a controller suitable for use in the control apparatus of FIG. 1.

As illustrated in FIG. 2, the controller 11 may comprise output memory registers 30, 32, 34, operable to provide control signals to each of the phase drives A, B C. The controller 11 is thereby able to control each of the three phase drives A, B, C to modulate the delivery of energy to the phase windings of the SR motor 1.

The controller 11 may store a flux reference 36. This flux reference 36 comprises data which provides an association between flux in a phase winding, torque demand, motor speed, and rotor angle. This may be in the form of a three dimensional look-up-table, or other relationship which enables a flux to be determined for a given combination of angle, speed and torque.

Figure 8:
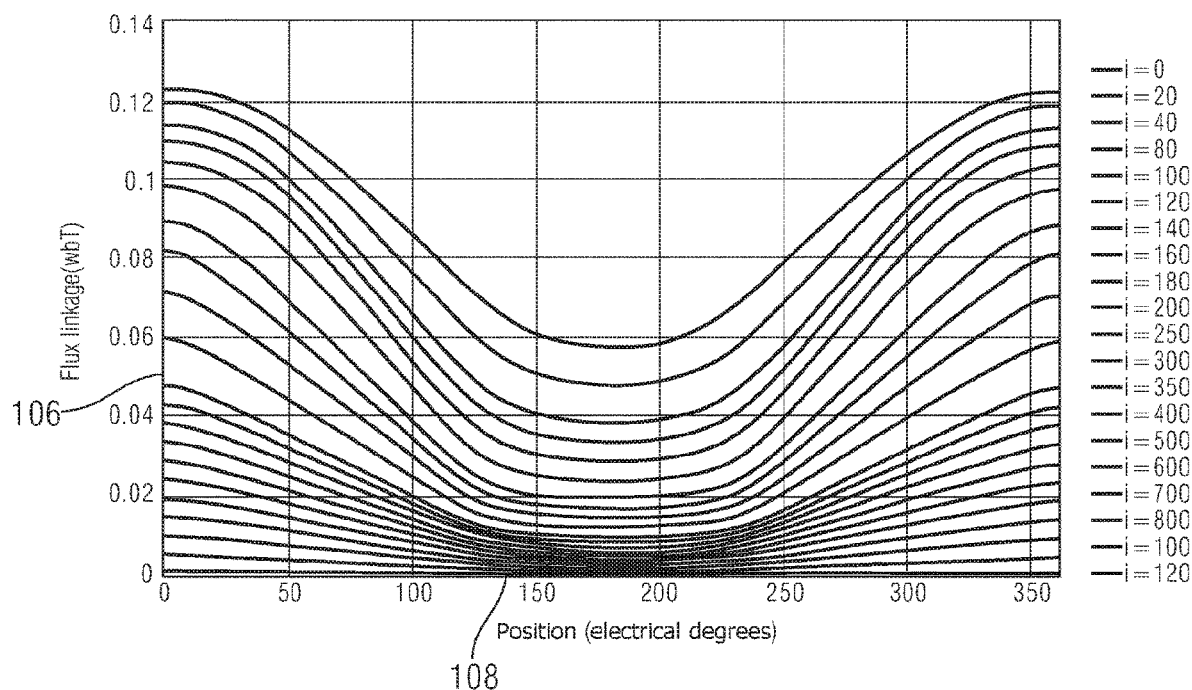
FIG. 8 comprises a plot of line graphs illustrating data from a flux characteristic of a switched reluctance motor.

The controller 11 may also store a flux characteristic 38 comprising data which relates rotor angle and phase winding current to the actual flux present in the motor. This may be stored in the form of a two dimensional look-up table, or any other relationship which enables the controller to determine the actual flux present in the motor for a given phase winding current and rotor angle. This may be determined in advance based on a characterisation of the motor and stored in memory of the controller 11. It will be appreciated in the context of the present disclosure that, conversely, this relationship between flux, current and angle also enables the controller to determine the angle of the rotor based on a given flux and a given current. A graphical illustration of such a flux characteristic is shown in FIG. 8, as shown in this illustration, the flux characteristic provides a mapping between flux, position (rotor angle) and current. FIG. 8 is described in more detail below.

The controller 11 is also operable to adjust the flux in each phase winding by controlling (via the relevant phase drive) the voltage applied to each winding. It will be appreciated in the context of the present disclosure that a flux adjustment may be achieved by applying a selected voltage for a selected time interval (flux, also known as flux linkage, having units of volt seconds—the integral of voltage with respect to time). This time interval may be predetermined, e.g. it may be set by a clock signal which drives a DSP.

Whether polling or interrupt driven, the controller operates on the basis of a series of clock cycles (or other discrete time step) the controller can be configured to determine the voltage demand that is required over the next clock cycle (or other time step) to achieve a given change in flux in that time. This may be achieved using a voltage characteristic which provides an association between the flux change required, the available DC Bus voltage, and voltage demand required to achieve that flux change. This voltage characteristic may take into account the duration of the clock cycle, or the flux change itself may be scaled by the duration of the clock cycle before being used to determine the voltage demand.

Overview of Operation

The controller is configured to provide four different modes of operation: (1) roll-over detect mode; (2) low-speed-lost mode; (3) low-speed torque mode; and (4) high speed torque mode.

Roll-over detect mode enables the controller to determine speed and position information about the motor, for example to provide an initial speed or position estimate when keyed in to a motor which may already be rotating.

Low-speed-lost mode is intended to be used, as the name suggests, to determine position information at low motor speeds.

Once rotor angle and speed have been established, the motor can be operated to produce torque. The controller is configured to operate the motor in one of the two torque modes (low speed or high speed), and to make the decision as to which mode to apply based on the speed of the rotor (and hence the current in the stator windings).

Low speed torque mode can be used to control the motor in modes of operation in which the current being driven, by the phase drives, in the phase windings allows sufficient headroom for the application of diagnostic pulses of flux, for example if it is zero (or falling) for at least part of a motor cycle.

High speed torque mode can be used to control the motor when the current in the stator windings never drops sufficiently to enable the low-speed torque mode to be used.

In operation, when the controller is first switched on, the rotor angle is generally not known, and the rotor may already be turning at some unknown speed. The controller is configured so that, in the event that the rotor angle and/or speed are not known, the controller operates in either the roll-over detect mode, or the low-speed-lost mode. The roll over detect mode may be applied first, and in the event that the controller is unable to determine the rotor angle or speed in this mode, it may apply the low speed lost mode. Once the rotor angle and speed have been determined, the controller operates in which ever of the two torque modes is appropriate for the motor speed. The roll over detect mode need not be used. For example other methods may be used to determine if the motor is spinning at a speed below the minimum speed at which diagnostic pulses are generally used. For example the low speed lost method could be used over the whole speed range, e.g. from stationary. It may be helpful to modify the flux reference used for the low-speed lost method to enable operation at the very lowest speeds. As a further possibility at such low speed simple cheap physical position sensors may be used to avoid the need for roll-over-detect.

In the low speed torque mode, the controller selects a flux reference based on torque demand and rotor speed. This flux reference provides (for that torque demand and rotor speed) a mapping between rotor position, stator phase current, and flux.

At low motor speeds such flux references generally include ranges of rotor angles for which the current in one or more of the stator phases is inactive. For example the current in one of the stator phase windings may be quiescent, for example it may be negligible, for example zero. In the low speed mode, the controller applies pulses of known flux to an inactive stator phase winding and determines the rotor position based on the resultant current (e.g. the current arising in that stator phase winding in the presence of that known flux).

At higher motor speeds, the current lobes from one electrical cycle may merge into those of the next cycle—the stator phases may be being driven constantly by the phase drives. As a result they may never be inactive, and so it may not be possible to add the diagnostic pulses of known flux which are used at lower speeds. In the high speed mode, the controller may instead estimate the flux present in a stator phase winding by integrating the voltage applied to that winding. Embodiments of the disclosure may augment this integration process by resetting the integrated flux based on the current in the winding as the rotor passes an angular position of minimum inductance. This may be done once per cycle, or at another selected number of passes through this point of minimum inductance. Some embodiments of the high speed torque mode may thus reduce or avoid the problem of integrator drift.

The controller can then estimate the rotor angle based on the estimated flux and the current sensed in the phase winding. This estimate of rotor angle may also be augmented based on (a) the estimate of flux, and (b) an estimate of the flux error which itself is based on the current in the winding and an error characteristic defining the differential of angle with respect to flux. Either or both of these two augmentations may be applied.

The four modes of operation are discussed in more detail below.

The roll-over detect mode is illustrated in FIG. 3. In this mode the controller 11 controls the phase drives A, B, C to apply constant flux in the motor. Whilst this flux is being applied, the controller obtains a signal from the current sensor 13 to determine the current in one or more of the stator phase windings. The controller 11 then uses the known (constant) flux, and the sensed current to index the stored flux characteristic 38.

In more detail, as illustrated in FIG. 3, roll-over detect mode proceeds as follows. The controller controls the stator phase drives to apply 40 a constant voltage to each stator phase winding during each clock cycle. While this constant flux is being applied, the controller obtains 42 a signal from the current sensor indicating the current in one or more of the stator windings. This may be done at intervals, which may be regular. For example it may be done at a selected number of clock cycles, e.g. on every clock cycle, or every third clock cycle, or at some other interval.

If the rotor is rotating, the inductance changes associated with movement of the rotor provide cyclic current changes in the stator phase windings. The controller is configured to determine a fiducial point in each current cycle (a timing fixed reference, such as a peak or trough). These markers can then serve to count cycles of current. One way to achieve this is to mark the end of a cycle when the current begins to rise (or stops falling). It may also be done by identifying when the current begins to fall, or stops rising. Having established a fixed reference in each cycle, the rotor speed can then be determined based on the frequency with which rotor cycles take place. The controller also determines the position of the rotor based on the sensed current and the applied flux by using the current and flux to index the stored flux characteristic.

The controller can then use the known rotor position and speed to begin 46 operation in one of the two torque modes.

In the event that the rotor speed is very low the variations in current may not be sufficiently large for this method to be reliable.

FIG. 4 illustrates low-speed lost mode. In the event that the controller is unable to establish a reliable estimate of speed and position using the roll-over detect mode, the controller may switch to the low-speed lost mode. The low speed lost mode may also be used from standstill (e.g. when the rotor speed is known to be zero).

In the low-speed lost mode, the controller first determines 50, based on the DC Bus voltage, the voltage available to establish flux in the motor. It then determines the timing and voltage amplitude of a pulse to be applied to the phase windings to establish a selected flux level. The controller then operates the phase drives to apply 52 a series of these pulses to two of the phase windings. The controller obtains 54 signals, from the current sensor, indicating the current in each of these two phase windings during these pulses of known flux. This provides, for each of two phase windings, two pairs of data values—the flux in the winding and the corresponding current.

The controller then uses 56 each of the pairs of flux and current data to index the stored flux characteristic 38. Where the flux characteristic 38 of the motor is rotationally symmetric a single pair of flux and current data may give rise to two possible rotor angles. In this eventuality, the controller may use the two rotor angles associated with the second pair of flux and current data to identify the correct rotor angle—e.g. the rotor angle which matches for the two windings. An additional, or alternative process for mapping current to position may also be used to determine rotor position as described below.

A series of such diagnostic pulses may be used. This can provide a series of rotor angle measurements at known time intervals. Accordingly, the controller can use the rotor angle measurements, and their timing, to determine 58 the speed of the rotor.

The controller can then use the known rotor position and speed to begin 60 operation in one of the two torque modes.

Figure 5:
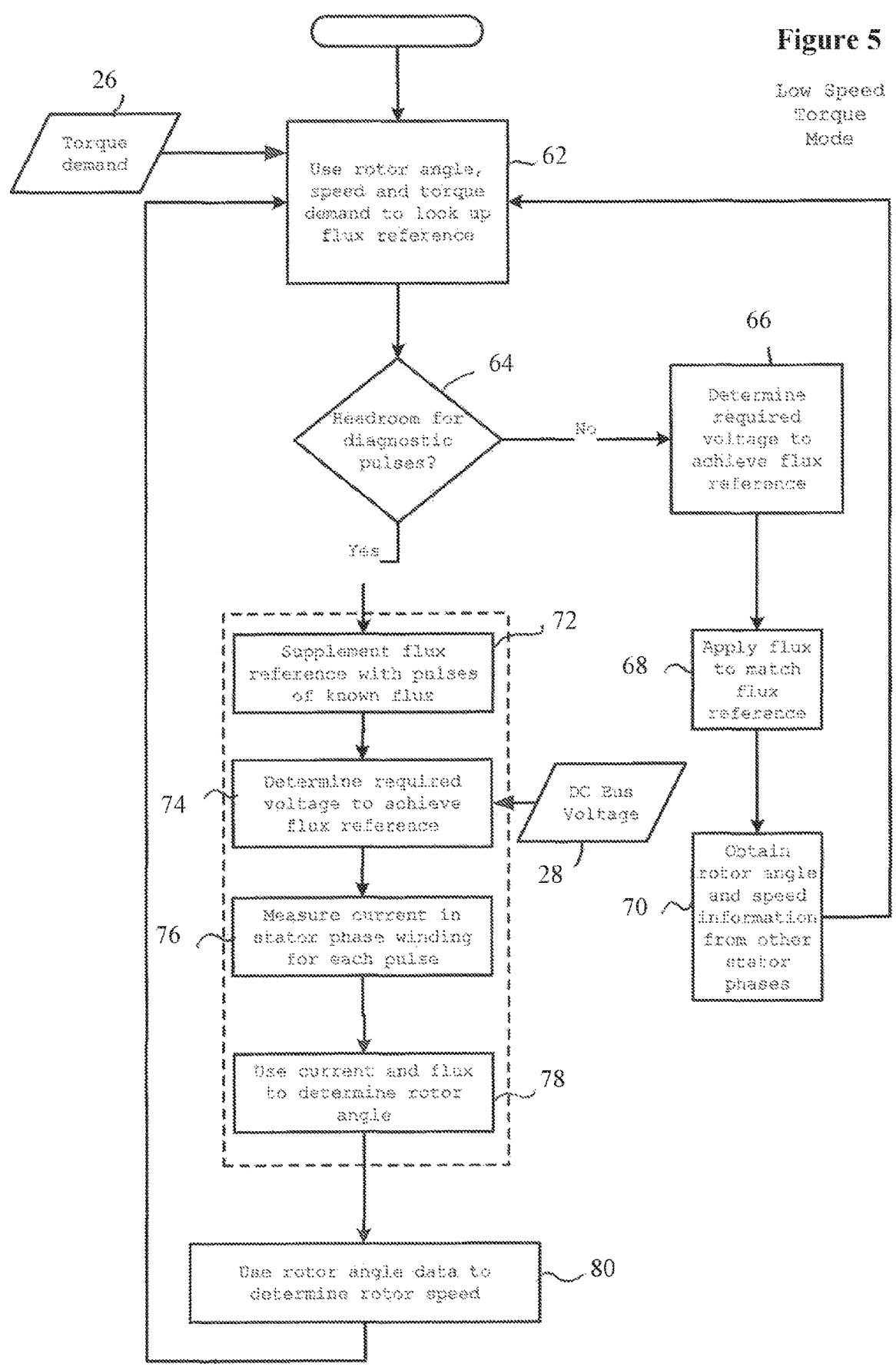
FIG. 5 is a flow chart illustrating one method of operating a control apparatus such as that illustrated in FIG. 1.

FIG. 5 illustrates the low speed torque mode. This mode operates by identifying a flux reference that is to be applied to achieve the desired motor torque and speed. In order to determine rotor angle in this low speed torque mode, the controller may add diagnostic pulses of known flux to this reference during intervals in which the flux reference is zero or falling (with sufficient headroom to accommodate the pulses).

In more detail, once the rotor angle and speed have been established the controller obtains a torque demand signal 26 from the input interface 2. The controller uses 62 the flux reference 36, the torque demand signal 26, the rotor angle 16, and the rotor speed 18 to determine the required flux in each of the stator phase windings. Having determined the required flux, the controller determines 64 whether there is sufficient headroom available to add a diagnostic pulse to the required flux. For example, the controller may be configured so that if the required flux in one of the stator phase windings is less than a selected threshold level, for example zero, the controller may determine that there is sufficient headroom. In the alternative, the controller may determine that there is not sufficient headroom, for example if the phase drives are already providing maximum voltage to the phase winding.

In the event that the diagnostic pulses are not to be applied, the controller determines 66 the voltage that is required to achieve the flux reference value associated with the current rotor angle, speed, and torque demand. The controller then operates 68 the phase drives to provide this voltage to the stator phase winding. Rotor and speed information may be obtained 70 from other motor phases (e.g. from diagnostic pulses applied to other windings) or it may be estimated based on prior speed and angle data. The controller can then continue to control the phase drives to apply energy to the phase windings according to the flux reference (given the rotor angle, speed, and torque demand).

In the event that there is sufficient headroom to do so, the controller may apply 72 diagnostic pulses to a phase winding. In other words, the controller modifies the flux in a phase winding to obtain rotor angle information. As a result, the applied flux differs from the flux that is required simply to provide the motor torque demand. This modification may comprise supplementing the flux with pulses of selected flux amplitude.

To achieve this, the controller first determines 74, based on the flux change required, the voltage that is to be applied to the phase winding. The controller then operates the phase drives to provide this voltage in the phase winding thereby achieving the selected flux in that winding. While this flux is being applied, the controller obtains 76 a current signal from the current sensor. The controller then uses 78 the current signal, and the (known) applied flux to determine the rotor angle using the flux characteristic 38.

An additional, or alternative process for mapping current to position may also be used to determine rotor position as described below. In particular, in the low-speed-lost mode, and low-speed-torque mode, described with reference to FIG. 4 and FIG. 5, the methods and apparatus of the present disclosure may calculate the voltage that is to be applied to achieve a target flux in the diagnostic pulses (e.g. as in steps 52 and 54, and steps 74 and 76, described above). In some embodiments, pulse width modulation, PWM, may be used to apply the voltage, and so the actual flux may not be exactly the same as the target flux. Accordingly, embodiments may measure the actual flux of each pulse. In these embodiments the measured, actual, flux value may be used to select a current vs. position relation from amongst a set of such relations. The measured current in the phase winding can then be used to with such a relation to determine the position. For example the set of relations may comprise a set look-up-tables (LUTs) each for a particular actual (measured) flux, and each of which provides a mapping from current to rotor position. The rotor position can thus be determined by measuring actual flux, and measuring actual current, and using the flux and current to determine rotor position by using a relation between flux and current on the one hand, and rotor position on the other hand. It will be appreciated in the context of the present disclosure that instead of a two-stage look-up (using flux to select a current vs position relation, and then using this relation and current to determine position), a 3D look up table or similar relation may be used to determine position in a single step. Any appropriate association may be used to provide this mapping function. Thus in FIG. 4, an optional an additional step may be included between steps '52' and '54' in which actual flux is measured. Also in FIG. 5 a similar step could be added between '74' and '76'. In either case, there may then be no need to calculate the flux as described above.

A series of such pulses may be applied in quick succession to obtain a series of position updates—for example the steps of applying a selected flux to a phase winding, determining the resultant current in that winding, and using the flux characteristic to determine the associated rotor angle may be repeated. In addition, the pulses may be applied to more than one of the stator phase windings during any one motor cycle (mechanical cycle of the motor).

Accordingly, a series of rotor angle measurements, and the timing of those measurements can be determined. On this basis, the controller determines 80 not only the rotor angle, but also its speed. Having determined the rotor angle and speed, the controller can then use the flux reference and the torque demand to determine the flux that is to be applied to the motor.

As motor speed increases, there may come a point at which there is never sufficient headroom to allow diagnostic pulses to be added to the flux reference. In this eventuality, the low-speed torque mode described above can no longer be applied. The controller may be configured to detect this condition by comparing at least one of the current, voltage and flux in the phase windings with a limit condition.

Figure 6:
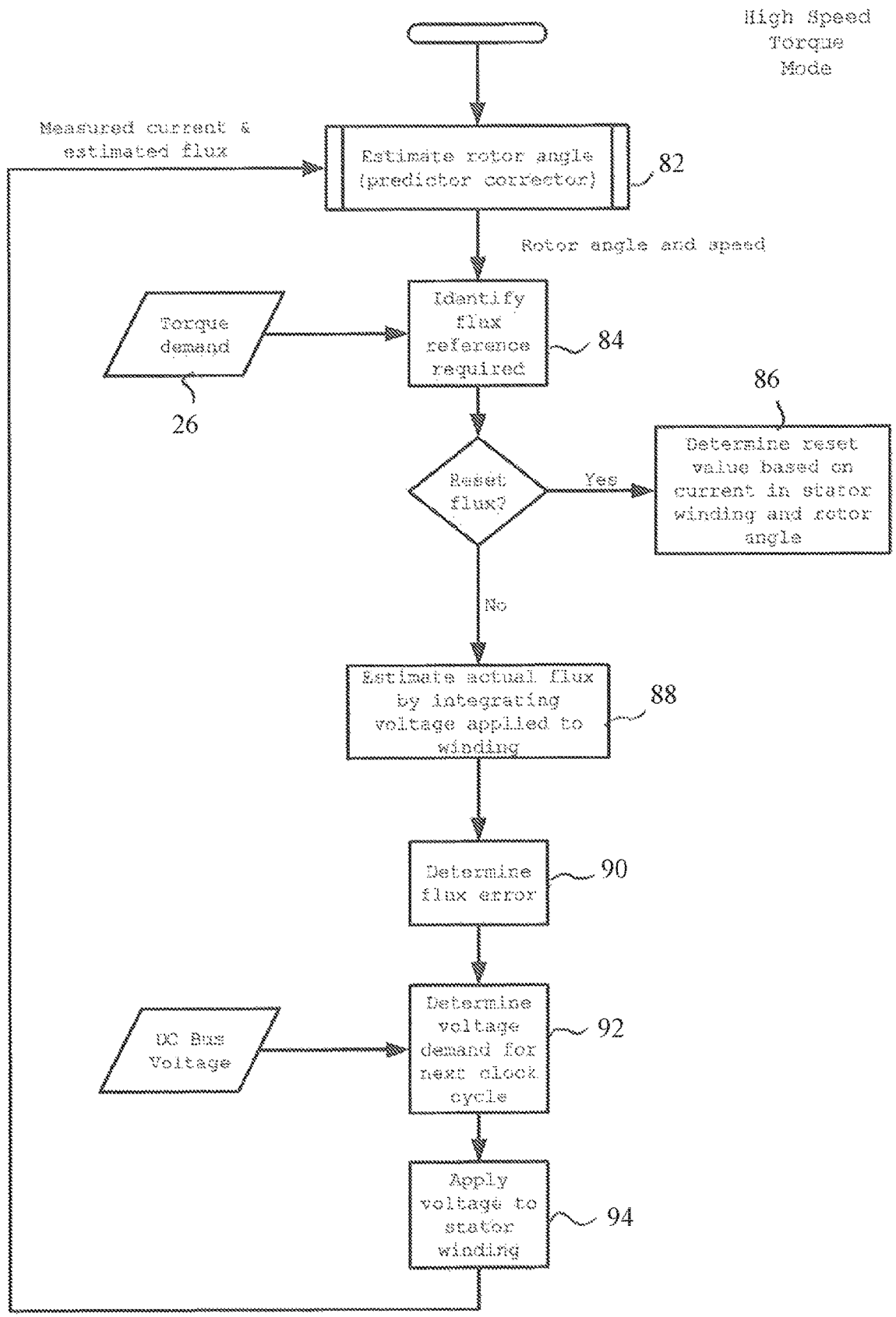
FIG. 6 is a flow chart illustrating one method of operating a control apparatus such as that illustrated in FIG. 7.

FIG. 6 illustrates operation of the high speed torque mode.

In the high speed mode, the controller determines 82 the rotor angle and speed based on the current sensed in the phase windings and the estimated flux in the motor. The estimate of flux used in this process may be obtained by integrating the voltage applied to the phase windings as a function of time (e.g. summing the voltage applied during each clock cycle). One way to determine the rotor angle and speed is explained in more detail below with reference to FIG. 7. In the interests of putting the description into context however, the high speed mode is first explained in overview with reference to FIG. 6.

The controller then uses the flux reference, the torque demand, rotor angle, and speed to determine 84 the flux that is required in the phase winding.

Before determining the voltage that is to be applied to the winding to achieve this required flux, the controller determines whether the rotor angle meets a reset condition—for example whether it is greater than or equal to 180°. In the event that the rotor angle meets this condition, the controller obtains 86 an estimate of flux from the flux characteristic 38 by using the rotor angle value and the sensed current in the phase winding. The estimate of flux in the phase winding for the present clock cycle is then set to match this value. This reset of the flux estimate marks the start and end of a control period of the motor.

In the alternative, if the rotor angle does not meet the reset condition, the controller estimates 88 the flux in the phase winding by incrementing the previous estimate of flux by the time integral of the voltage applied to the winding over the previous clock cycle. The controller then determines 90 the flux change required by comparing the flux reference (determined at 84, above) with this actual flux.

The controller then determines 92 based on the flux change required and the available DC bus voltage, the voltage that is to be applied to the phase winding. The controller then operates 94 the phase drives to provide this voltage in the phase winding. The controller then increments the estimate of flux by the flux change applied in the stator winding (e.g. by the integral of voltage over the clock cycle), and obtains a current signal from the sensor.

The estimated (incremented) flux and the current signal from the sensor are then used in the next clock cycle to estimate 82 the rotor angle and speed. This process of integrating flux increments through the control period of the motor continues until the reset condition is met (e.g. the rotor angle is greater than or equal to 180°). This marks the start and end of a control period of the motor, and the process of integrating flux increments begins again.

At the start of each motor control period (immediately after the reset described above), the accuracy of the flux estimate will generally be at its highest. Thereafter, as the flux control period advances the accuracy of the flux estimate may degrade (e.g. due to the accumulation of errors associated with the integration process). As a result, a window of flux values might in fact be valid—e.g. the actual estimate plus or minus the accumulated error. This inaccuracy may be acceptable, but in some cases higher precision control may be desired.

Figure 7:
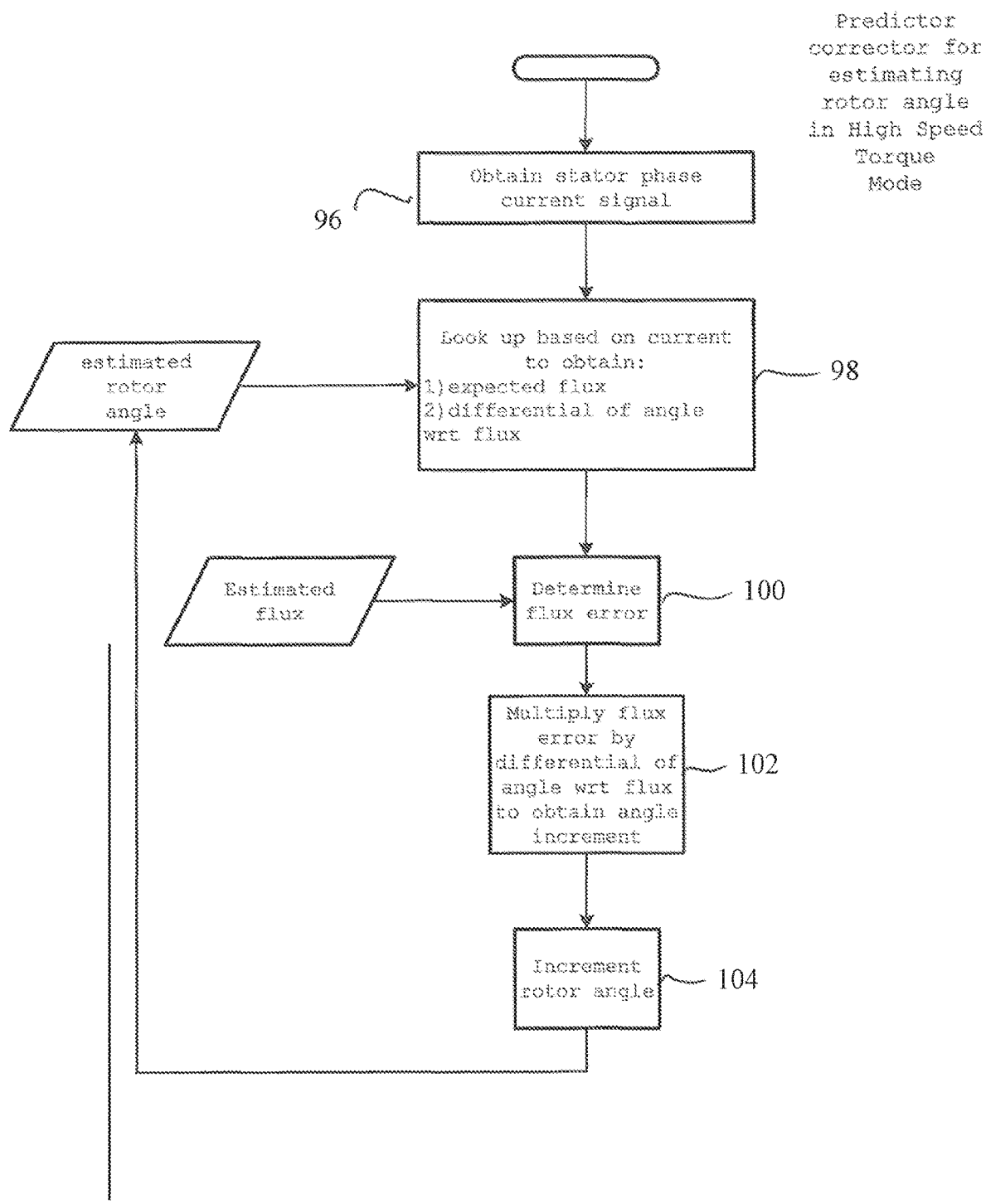
FIG. 7 is an illustration of a control apparatus.

FIG. 7 illustrates one method of addressing this inaccuracy. If this method is to be adopted, the controller 11 may comprise angle error characteristic data, $d\theta/d\Psi$. This data defines, for each of a set of rotor angles the differential of rotor angle with respect to flux in a phase winding as a function of the current in that phase winding. It will also be appreciated that the flux characteristic (such as the characteristic 38) illustrated in FIG. 2 defines flux as a function of phase current for the set of rotor angles. Accordingly, once the motor control period has begun, the present estimate of rotor angle can be used to obtain:

(1) flux characteristic data which defines flux as a function of phase current at that rotor angle, and (2) angle error characteristic data, $d\theta/d\Psi$ which defines the differential of rotor angle with respect to flux as a function of phase current.

The controller obtains 96 a signal indicating the current in the stator phase winding, and uses this current signal with the flux characteristic to obtain 98 an expected flux. The controller also uses the current signal to obtain 98 the differential of rotor angle with respect to flux from the angle error characteristic.

The controller determines 100 a flux error by subtracting the expected flux (obtained from the flux characteristic) from the present estimate of flux (obtained by incrementing a previous estimate of flux by the time integral of voltage applied to the stator phase).

The controller then multiplies 102 the flux error by the differential of rotor angle with respect to flux to obtain an angle error. The controller then uses 104 the angle error to adjust the present estimate of rotor angle.

This adjusted estimate of rotor angle can then be used (as explained with reference to FIG. 6 with reference to numerals 82 and 84) with the torque demand, and speed to determine (from the flux reference) the flux that is required in the phase winding.

To illustrate a flux characteristic FIG. 8 shows a pair of axes in which: the X-axis 108 indicates rotor angle between 0° and 360°, and the Y-Axis 106 indicates flux linkage in one stator phase winding (also referred to herein by the abbreviation, 'flux'). FIG. 8 also shows a series of line plots on these axes, each of these line plots illustrates the variation of flux with rotor angle for a particular current. It will be appreciated in the context of the present disclosure that this series of line plots could also be represented as a surface. It will also be appreciated that interpolation may be used to provide information which falls between the stored data values. The function of the flux characteristic is to enable two of the three variables (flux, current, angle) to be used to determine the other. This function may be provided by a look up table, or by analytical functions such as power series, polynomial or trigonometric functions. In addition analytical and numeric methods of providing this function may be used together. For example, the flux characteristic may be provided by interpolation between look up table values.

Figure 9:
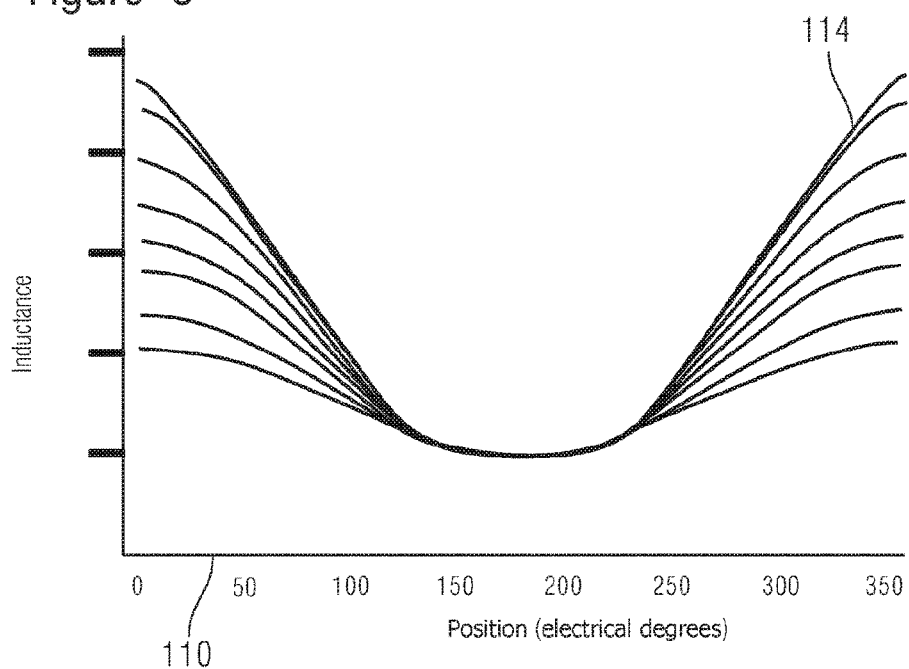
FIG. 9 comprises a plot of line graphs illustrating data from a flux characteristic of a switched reluctance motor.

FIG. 9 shows a plot of an inductance/position characteristic having a pair of axes in which: the X-axis 110 indicates rotor angle between 0° and 360°, and the Y-Axis 112 indicates inductance. The plot includes a set of inductance vs. position curves 114, each relating to a different stator winding (phase) current value. It can be seen from these curves that, at a particular range of rotor positions, the variation of inductance with position becomes very small. Characteristics vary between motors, but where the inductance is at a minimum, the variation of flux as a function of position may also be small. Where integration of flux is to be used, this can enable the integrated flux to be reset at a point of minimum inductance (which may be identified based on a reset condition as described elsewhere herein). The reset flux value can be selected based on the phase winding current using stored data which defines the flux as a function of that current at the point of minimum inductance.

The SR motor may be either short pitched or fully pitched. In so called "short-pitched" SR motors, the stator winding comprises a set of coils, each of which is wound on one pole of the stator. In so called "fully pitched" SR motors, the coils of the stator winding may each be wound onto more than one of the stator poles.

The SR motor and power provider illustrated in FIG. 1 each have three phases. However it will be appreciated in the context of the present disclosure that a greater or lesser number of phases may be present in the motor, and in the power provider. It will also be noted that the current sensor is described as being arranged to sense current in at least one of the phase windings. In some embodiments the current sensor is arranged to sense currents in two of the phase windings. This can enable the controller to operate in low-speed lost mode as explained above.

Although a variety of modes of operation have been described, it will be appreciated in the context of the present disclosure that not all of these methods may be implemented—some controllers according to the present disclosure may implement only one, or more than one, of these modes.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It will be appreciated that a method of controlling a switched reluctance motor has been disclosed. Such motors typically comprise a stator carrying a plurality of phase windings and a rotor. The phase windings are activated in a sequence which applies a selected torque to the rotor. The sequence may be defined by bot the timing of activation of each winding, and the level of its activation—e.g. the current/voltage or flux waveform applied by each winding. During a cycle of rotation of the rotor the phase windings switch between an active state and an inactive state. The current in the phase windings in the active state apply the selected torque to the rotor. Those windings which are in the inactive state do not contribute appreciably to the instantaneous torque. In other words, typically the winding (or windings) which are in the active state are responsible for all of the selected torque. In some embodiments the methods of the present disclosure comprise applying a voltage to a phase winding whilst that phase winding is in the inactive state to provide a flux in the selected phase winding. During this so called diagnostic pulse the current in that phase winding can be determined (e.g. by being measured using a sensor). The flux on the other hand may be determined by integrating the applied voltage with respect to time. The rotor angle can then be determined based on the current and the flux—e.g. using a flux mapping which provides a relationship between current, flux and rotor angle. The motor control apparatus described herein may comprise data storage storing a plurality of such flux mappings, and each flux mapping may be associated with a range of rotor speeds. The method may comprise selecting the flux mapping which is to be used based on the rotor speed.

Other embodiments of the disclosure relate to methods of controlling a switched reluctance motor in which the flux to be applied by a stator winding is selected based on the rotor angle, and the rotor angle is determined by an iterative, or time-stepping, method which proceeds in a series of discrete time steps. This method comprises obtaining previous flux data indicating the flux in a stator winding at a preceding time step, and incrementing the previous flux data by a flux increment to determine present flux data. The flux increment is determined by integrating a voltage applied to the stator winding since the preceding time step—this may be done by simply multiplying the average voltage applied during that time step by the duration of the time step. The present stator winding current can be obtained, for example by using a current sensor. The rotor angle for the present time step can then be determined based on the present flux data and the present stator winding current.

The previous flux data can be obtained by selecting one of: (a) flux data obtained during a preceding iteration (e.g. time step) of the method, and (b) reset data selected based on the rotor angle (e.g. for the present time step) and the present current in the stator winding. This may enable flux determined by forward integration over time to be reset based on the current in the winding as the rotor passes an angular position of minimum inductance—or any other reset condition is met. This reset condition may be chosen so that the reset occurs once per cycle, or at another selected number of passes through this point of minimum inductance. Some embodiments of this so-called high speed torque mode may thus reduce or avoid the problem of integrator drift.

Due to the inductance/position characteristic of the SR machine there is a large window around the minimum inductance position (which may be 180°) where the inductance is fairly constant irrespective of rotor angle and/or winding current. If the actual current is read at the position of minimum inductance it can be used to give a good indication of actual motor flux, even if the position is not exact. This value can be used to reset the integrator to reduce or avoid drift. This should also work with continuous current mode of operation where there will be a standing flux in the machine at the minimum inductance position. An example of the inductance/position characteristic of a typical SR motor is illustrated in FIG. 9.

Any one or more of the methods described herein may be implemented in a controller, such as a DSP controller operating on polling driven input/output—e.g. based on a constant or externally controlled clock. Such a controller may be coupled to control gate drive circuitry for controlling power transistors of an electric motor drive (such as an inverter or other appropriate power control bridge). The power devices for may be arranged as a full bridge e.g. with four power switches/transistors per motor phase. A more traditional SR bridge which consists of two power switches and two diodes may also be used. In such arrangements, the diodes normally pick up commutation when the main power switches are turned off and current continues to free-wheel through the diodes until the current has decayed to zero at which point the diodes stop conducting. In embodiments where a 'full bridge' is used, the controller may keep the switches which are acting as the diodes on until the current has decayed before switching to an all-off state.

Such a drive is itself typically operable, by control of these transistors, to apply selected voltage waveforms to the phase windings of a fixed reluctance motor. The DSP controller may also comprise inputs (such as input registers) which can be used to obtain phase winding current monitoring data—e.g based on sensors signals from one or more electrical current sensors coupled to sense the current flowing in the phase windings of the motor.

In some embodiments a three phase flux controller is used. This may consist of three single phase flux controllers. Of course there may be more than three phases. In an embodiment each flux controller can determine the voltage which, when applied over the next control cycle will deliver the desired flux to the machine phase winding. The controller takes in a flux reference, subtracts the actual flux to create a flux error and then, with knowledge of the available bus voltage, creates a duty cycle demand which will realise this volt/second demand. The flux control may running at a control rate of 60 µs. A torque demand signal (e.g. obtained from an operator input) may be read and converted to a flux reference every 1 ms. The flux reference may have been derived from previous characterisation of the switched reluctance machine. A three-dimensional look-up table indexed by torque, rotor speed and rotor angle may be used to determine the correct flux reference required in the winding. Two sets of tables may be used, one for operating in a motoring mode and one for operating in a generating mode.

If rotor position (angle) is known, and the current in the winding(s) is known or can be measured, e.g. by a sensor then the current in the winding together with the known position can be used to arrive at an accurate measure of the flux in the machine. A simple two-dimensional look-up table can be used to calculate actual flux, or a set of one dimensional look-up tables (one for each of a set of phase winding current values).

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. Flux may be measured by measuring voltage and integrating it minus a resistive voltage drop associated with passage of current through the windings to get the flux—in other words integrating (v−ir)dt. Where reference is made to measuring flux this may thus be achieved by measuring current and voltage in phase windings and integrating as described. Other methods of measuring flux may also be used.

For the reasons explained above, embodiments of the disclosure may be configured to operate using polling input/output as opposed to interrupt driven input/output. For example the controller may be provided by a DSP. Examples of such controllers may be driven by a clock which causes the operator of the controller to obtain input and provide output by reading/writing data values from/to memory registers of the controller based on the clock, for example once (or another fixed number of times) per clock cycle. Such architecture may be distinguished from interrupt driven architecture, such as that provided in more complex microcontrollers and FPGAs in which an input to the controller. It will be appreciated in the context of the present disclosure however that the activities and apparatus outlined herein may be implemented with other kinds of logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, such as software and firmware, or any suitable combination thereof.

The invention claimed is:

1. A method of controlling a switched reluctance motor, the method comprising:
   controlling flux in stator windings of the motor in a sequence selected to apply torque to its rotor during periods of rotation of the rotor, wherein the flux is selected based on a rotor angle and the rotor angle is determined by an iterative method comprising:
   obtaining previous flux data indicating the flux in a stator winding at a preceding time;
   incrementing the previous flux data by a flux increment to determine present flux data, wherein the flux increment is based on integrating a voltage applied to the stator winding since the preceding time;
   obtaining present current data indicating the present current in the stator winding; and
   determining a present rotor angle based on the present flux data and the present current data;
   wherein obtaining previous flux data comprises
   obtaining reset data selected based on a previous rotor angle and the current in the stator winding.

2. The method of claim 1 wherein the reset data is used to provide the previous flux data in the event that the previous rotor angle is within a selected range of rotor angles.

3. The method of claim 2 wherein the selected range of rotor angles coincide with a minimum of inductance of the stator winding.

4. The method of claim 1 wherein the previous rotor angle used to select the reset data comprises an estimate of rotor angle from a previous iteration of the method.

* * * * *